US010281928B2

(12) United States Patent
Behling et al.

(10) Patent No.: US 10,281,928 B2
(45) Date of Patent: May 7, 2019

(54) SYSTEMS AND METHODS FOR RAISING AND LOWERING A MARINE DEVICE ON A MARINE VESSEL (71) Applicant: Brunswick Corporation, Lake Forest, IL (US)

(72) Inventors: Chad J. Behling, Fond du Lac, WI (US); Kenneth G. Gable, Oshkosh, WI (US); Matthew D. Jarrell, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 159 days.

(21) Appl. No.: 15/601,069

(22) Filed: May 22, 2017

(65) Prior Publication Data
US 2018/0335788 A1    Nov. 22, 2018

(51) Int. Cl.
*B63H 20/10* (2006.01)
*G05D 1/08* (2006.01)
(Continued)

(52) U.S. Cl.
CPC .............. *G05D 1/0875* (2013.01); *B63B 1/22* (2013.01); *B63B 45/00* (2013.01); *B63B 45/08* (2013.01);
(Continued)

(58) Field of Classification Search
CPC ........ G05D 1/0875; B63B 1/22; B63B 45/00; B63B 45/08; B63B 2201/02;
(Continued)

(56) References Cited

U.S. PATENT DOCUMENTS 4,586,172 A    4/1986 Vernet et al.
4,861,292 A    8/1989 Griffiths et al.
(Continued)

FOREIGN PATENT DOCUMENTS

WO    2016036616    3/2016

OTHER PUBLICATIONS

Andrasko et al., "System and Method for Automatically Controlling Trim Position of a Marine Drive Unit", Unpublished U.S. Appl. No. 14/874,848, filed Oct. 5, 2015.
(Continued)

*Primary Examiner* — Peter D Nolan
*Assistant Examiner* — Wae L Louie
(74) *Attorney, Agent, or Firm* — Andrus Intellectual Property Law, LLP (57) ABSTRACT A system for a marine vessel operating in a body of water includes a trimmable marine device coupled to and movable with respect to the vessel and an actuator that raises and lowers the marine device. A control module is in signal communication with the actuator. A GPS receiver determines a current and/or predicted global position of the vessel, and a processor accesses a memory storing bathymetry data and retrieves a water depth corresponding to the vessel's current and/or predicted global position. The control module compares the water depth to a depth of the marine device based on the marine device's current position. The actuator raises the marine device in response to the control module determining that the water depth is not enough to accommodate the depth of the marine device at the current position without potential collision between the marine device and the body of water's bottom.

20 Claims, 6 Drawing Sheets (51) Int. Cl.
*B63B 1/22* (2006.01)
*B63B 45/00* (2006.01)
*B63B 45/08* (2006.01)
*G01S 19/13* (2010.01)
*B63J 99/00* (2009.01)

(52) U.S. Cl.
CPC .............. *B63H 20/10* (2013.01); *G01S 19/13* (2013.01); *B63B 2201/02* (2013.01); *B63B 2201/04* (2013.01); *B63B 2726/00* (2013.01); *B63J 2099/006* (2013.01)

(58) Field of Classification Search
CPC ..... B63B 2201/04; B63H 20/10; G01S 19/13; B63J 2099/006
USPC .......................................................... 701/21
See application file for complete search history.

(56) References Cited

U.S. PATENT DOCUMENTS

| | | | |
|---|---|---|---|
| 5,118,315 A | 6/1992 | Funami et al. | |
| 5,238,432 A | 8/1993 | Renner | |
| 5,263,432 A | 11/1993 | Davis | |
| 6,007,391 A | 12/1999 | Eilert | |
| 6,458,003 B1 | 10/2002 | Krueger | |
| 6,734,808 B1 | 5/2004 | Michaelson et al. | |
| 6,890,227 B1 | 5/2005 | Alby et al. | |
| 7,148,811 B1 * | 12/2006 | Bustamante | H04B 13/02 340/850 |
| 7,416,456 B1 * | 8/2008 | Gonring | B63H 20/10 440/1 |
| 8,583,300 B2 | 11/2013 | Oehlgrien et al. | |
| 8,645,012 B2 * | 2/2014 | Salmon | G05D 1/0206 701/21 |
| 8,682,515 B2 | 3/2014 | Ito | |
| 9,290,252 B1 | 3/2016 | Tuchscherer et al. | |
| 9,643,698 B1 * | 5/2017 | Andrasko | B63B 45/04 |
| 9,694,892 B1 * | 7/2017 | Anschuetz | B63H 20/10 |
| 9,745,036 B2 * | 8/2017 | Andrasko | B63H 20/10 |
| 9,751,605 B1 * | 9/2017 | Anschuetz | B63H 20/10 |
| 9,764,810 B1 * | 9/2017 | Andrasko | B63H 20/10 |
| 9,896,174 B1 * | 2/2018 | Anschuetz | B63H 20/10 |
| 9,919,781 B1 * | 3/2018 | Andrasko | G05D 3/12 |
| 10,000,267 B1 * | 6/2018 | Anschuetz | G05D 3/00 |
| 10,011,339 B2 * | 7/2018 | Anschuetz | B63H 20/10 |
| 10,054,956 B1 * | 8/2018 | Anschuetz | G05D 1/0875 |
| 10,118,682 B2 * | 11/2018 | Anschuetz | B63H 20/10 |
| 2009/0163090 A1 | 6/2009 | Heromin | |
| 2013/0269583 A1 * | 10/2013 | Miller | B63C 1/02 114/263 |
| 2016/0375972 A1 * | 12/2016 | Andrasko | B63H 20/10 440/1 |
| 2016/0375973 A1 | 12/2016 | Andrasko et al. | |
| 2018/0335788 A1 * | 11/2018 | Behling | G05D 1/0875 |

OTHER PUBLICATIONS

Andrasko et al., "System and Method for Controlling Trim Position of Propulsion Devices on a Marine Vessel", Unpublished U.S. Appl. No. 15/243,101, filed Aug. 22, 2016.

Andrasko et al., "System and Method for Controlling Trim Position of Propulsion device on a Marine Vessel", Unpublished U.S. Appl. No. 15/243,285, filed Aug. 22, 2016.

Andrasko et al., "Systems and Methods for Automatically Controlling Attitude of a Marine Vessel with Trim Devices", Unpublished U.S. Appl. No. 14/873,803, filed Oct. 2, 2015.

Brown, David A., "3 Reasons you Need a Jack Plate for Your Fishing Boat", web article in "Outdoor Life", Apr. 4, 2016, available at http://www.outdoorlife.com/blogs/gonefishin%E2%80%99/3reasonsyouneedjackplateyourfishingboat.

Extended European Search Report for corresponding EP Application No. 18153561.8, dated Sep. 20, 2018.

* cited by examiner

SYSTEMS AND METHODS FOR RAISING AND LOWERING A MARINE DEVICE ON A MARINE VESSEL

FIELD

The present disclosure relates to systems and methods for raising and lowering a marine device coupled to a marine vessel.

BACKGROUND

Each of the below U.S. patents and applications is hereby incorporated herein by reference.

U.S. Pat. No. 4,861,292 discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

U.S. Pat. No. 5,263,432 discloses adjustment of a power boat's trim tabs that is automated throughout all phases of the operation of the boat. The boat's speed and/or the revolutions of its engine(s) are sensed and used by electronic circuits, including microprocessor-based circuits, to control prime movers, typically hydraulic pumps, in order to move the trim tabs to their optimal position. In one embodiment the boat's speed is sensed by a speedometer. Below a first predetermined speed, the boat's trim tabs are moved full down. Above a second, higher, predetermined speed the trim tabs are moved full up. In another embodiment the trim tabs are further adjusted in and about their up position, and while the boat is on-plane, so as to optimize the performance of the boat. The boat's on-plane performance is monitored by a speedometer or, preferably, by one or more tachometers. After the boat has exceeded the first predetermined speed, after the trim tabs have been initially adjusted to their full up positions, and after the speedometer or tachometer(s) is (are) continuously reading values within some small, preset, range, the trim tabs are perturbed slightly in position. The boat's throttle remains unchanged. After a settling time any effect of the changed trim tab position on the boat's performance is assessed. The trim tabs are moved in position until performance is no longer improved by further perturbations in position.

U.S. Pat. No. 6,007,391 discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 6,890,227 discloses a jack plate configured to allow removal of hydraulic components from a fixed portion of the jack plate without having to remove an outboard motor from the jack plate. A mechanical stop device is provided which supports a movable member of the jack plate relative to a stationary member of the jack plate and, as a result, supports the outboard motor even as the hydraulic components are removed from the jack plate. This allows the hydraulic cylinder, hydraulic pump, and motor to be removed from the jack plate by loosening and then detaching a removable bracket member from the jack plate. As a result, the hydraulic system can be inspected, maintained, or replaced without having to remove the outboard motor from the jack plate.

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 9,290,252 discloses systems and methods for controlling trim position of a marine propulsion device on a marine vessel. The system comprises a trim actuator having a first end that is configured to couple to the marine propulsion device and a second end that is configured to couple to the marine vessel. The trim actuator is movable between an extended position wherein the marine propulsion device is trimmed up with respect to the marine vessel and a retracted position wherein the marine propulsion device is trimmed down with respect to the marine vessel. Increasing an amount of voltage to an electromagnet increases the shear strength of a magnetic fluid in the trim actuator thereby restricting movement of the trim actuator into and out of the extended and retracted positions and wherein decreasing the amount of voltage to the electromagnet decreases the shear strength of the magnetic fluid thereby facilitates movement of the trim actuator into and out of the extended and retracted positions. A controller is configured to adapt the amount of voltage to the electromagnet based upon at least one condition of the system.

U.S. patent application Ser. No. 14/873,803, filed Oct. 2, 2015, discloses systems and methods for controlling position of a trimmable drive unit with respect to a marine vessel. A controller determines a target trim position as a function of vessel or engine speed. An actual trim position is measured and compared to the target trim position. The controller sends a control signal to a trim actuator to trim the drive unit toward the target trim position if the actual trim position is not equal to the target trim position and if at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband.

U.S. patent application Ser. No. 14/874,848, filed Oct. 5, 2015, discloses a method for automatically controlling a trim position of a trimmable drive unit with respect to a transom of a marine vessel, including retrieving from a memory a stored level trim position of the drive unit, measuring an actual trim position of the drive unit, and determining with a controller whether an absolute difference between the level trim position and the actual trim position exceeds a given threshold. The method also includes determining whether at least one of a plurality of trim-to-level enable conditions indicative of an idle state of an engine powering the drive unit is true. In response to a determination that the absolute difference exceeds the given threshold and that at least one trim-to-level enable condition is true, the method includes sending a control signal with the controller to trim the drive unit to the level trim position. A system for carrying out the method is provided.

U.S. patent application Ser. No. 15/243,101, filed Aug. 22, 2016, discloses a method of controlling trim position of two or more propulsion devices on a marine vessel, including receiving a running trim position for the two or more propulsion devices and receiving at least one of a steering input value or a roll angle of the marine vessel. An adjusted trim position for each of the at least two propulsion devices is then determined based on the running trim position and the steering input value or the roll angle of the marine vessel. A trim actuator for each propulsion device is then operated to move each propulsion device toward its respective adjusted trim position.

U.S. patent application Ser. No. 15/243,285, filed Aug. 22, 2016, discloses a method of controlling trim position for a propulsion device on a marine vessel, including receiving a running trim position for the propulsion device, receiving at least one of a steering input value or a roll angle of the marine vessel, and determining a magnitude of the steering input value or a magnitude of the roll angle of the marine vessel. The method further includes determining an adjusted trim position based on the magnitude of the steering input value or the magnitude of the roll angle of the marine vessel, and operating a trim actuator based on the adjusted trim position to decrease the trim angle of the propulsion device below the running trim position while the marine vessel is turning.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a system for a marine vessel operating in a body of water comprises a trimmable marine device coupled to and movable with respect to the marine vessel and an actuator configured to raise and lower the marine device relative to a surface of the body of water. A control module is in signal communication with the actuator. A global positioning system (GPS) receiver determines at least one of a current and a predicted global position of the vessel, and a processor accesses a memory storing bathymetry data and retrieves a water depth corresponding to the at least one of the current and the predicted global position. A sensor associated with the actuator provides information related to a current position of the marine device to the control module. The control module compares the water depth to the depth of the marine device based on the current position of the marine device. The actuator raises the marine device in response to a determination by the control module that the water depth is not enough to accommodate the depth of the marine device at the current position without potential collision between the marine device and a bottom of the body of water.

According to another example of the present disclosure, a method for moving a trimmable marine device coupled to a marine vessel operating in a body of water includes the following:

(a) determining at least one of a current and a predicted global position of the vessel;

(b) with a processor, accessing a memory storing bathymetry data and retrieving a water depth corresponding to the at least one of the current and the predicted global position;

(c) determining a current position of the marine device relative to a surface of the body of water and sending current position information to a control module;

(d) determining a depth of the marine device based on the current position information;

(e) with the control module, comparing the water depth to the depth of the marine device; and (f) automatically raising the marine device with an actuator in response to a determination by the control module that the water depth is not enough to accommodate the depth of the marine device at the current position without potential collision between the marine device and a bottom of the body of water.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for controlling actuators on a marine vessel so as to control a relative position of a trimmable marine device with respect to the marine vessel. For example, as used herein, the term "actuator" refers to any device used to rotate, translate, or otherwise move another marine device or apparatus up or down with respect to a surface of a body of water on which the marine vessel is operating. Examples of such actuators include trim actuators and jack plate actuators. In one example, the actuator includes a hydraulic piston/cylinder, although the principles of some of the below examples could apply equally to electric, pneumatic, or other types of actuators. The actuator may be moved between an extended position and a retracted position by provision of hydraulic fluid, electrical power, pneumatic fluid, etc. The extension and retraction of such actuators can be used to rotate, translate, or otherwise move other marine devices, such as components of the vessel's propulsion system or other devices located at the vessel's stern, up and down with respect to a marine vessel to which they are coupled and therefore with respect to the surface of the water. Examples of such other marine devices include, but are not limited to: trim tabs, trim deflectors or interceptors, and/or trimmable marine propulsion devices such as outboard motors or lower units of stern drives.

Those skilled in the art are familiar with how a jack plate can be attached to a transom of a marine vessel to support an outboard motor in such a way that the outboard motor can be raised or lowered relative to the position of the transom while the jack plate remains attached to the transom and the outboard motor remains attached to a movable portion of the jack plate. Jack plate actuators assist the operator of a marine vessel in raising and lowering the outboard motor by causing the movable portion of the jack plate to move relative to the stationary portion of the jack plate, which is attached to the transom of the marine vessel. Raising the outboard motor allows the vessel to get up on plane in shallower water than allowed by a standard, fixed mount; enables the thrust of the outboard motor to be directed parallel to the surface of the water, thereby increasing fuel efficiency; and provides for better hole shot.

Those skilled in the art of marine vessel propulsion and control are also familiar with many different ways in which the trim angle of a trimmable marine device can be manipulated to change the operating characteristics of the vessel. For example, manual trim control systems are known to those skilled in the art. In typical operation, the operator of a marine vessel can change the trim angle of the associated marine devices as the velocity of the vessel changes. This is done to maintain an appropriate angle of the vessel with respect to the water as it achieves a planing speed and as it increases its velocity over the water while on plane. The operator inputs a command to change the trim angle, for example by using a keypad, button, or similar input device with "trim up" and "trim down" input choices. The operator can select these input choices to trim the marine devices up or down until a desired handling or feel of the vessel over the water is achieved.

The system of the present disclosure is also capable of carrying out automatic trim (auto-trim) methods, in which the trim actuators are automatically extended or retracted with respect to their current positions in order to rotate the trimmable marine devices and thereby achieve a desired attitude of the marine vessel with respect to vessel speed or engine speed. Auto-trim systems perform the trim operation automatically, as a direct function of vessel speed or engine speed, without requiring intervention by the operator of the marine vessel. The automatic change in trim angle of the marine devices enhances the operation of the marine vessel as it achieves planing speed and as it further increases its velocity over the water while on plane. The trimmable marine devices can also be positioned to affect vessel roll and pitch.

Figure 1:
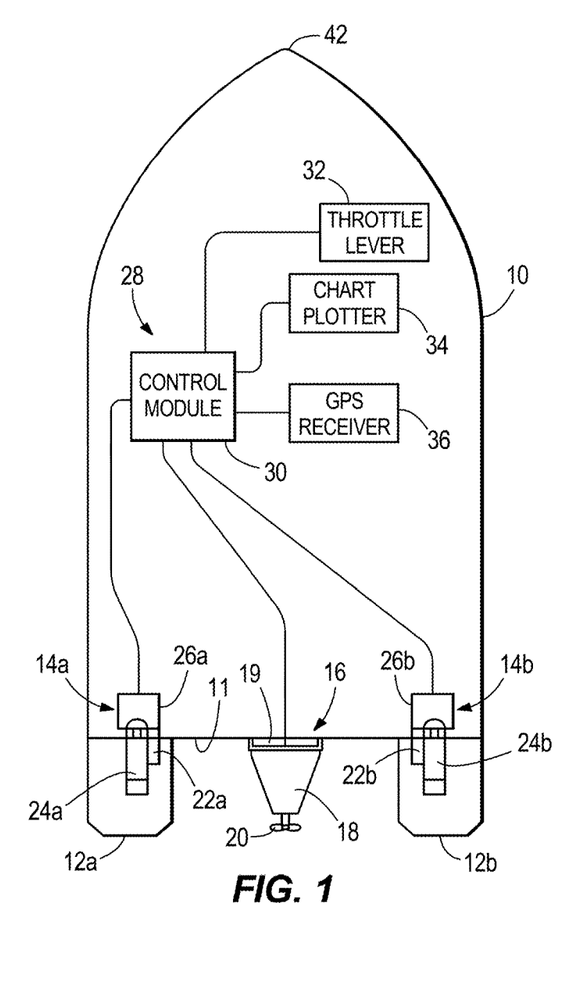
FIG. 1 illustrates one example of a marine vessel having trim tabs coupled to its transom.

FIG. 1 illustrates one example of a marine vessel 10 having at least two trimmable marine devices, here, first and second trim tabs 12a, 12b connected to the transom 11 of the marine vessel 10, and moved by trim actuators 14a, 14b. The marine vessel 10 includes a propulsion system 16 including a drive unit 18, which may be, for example, a pod drive, inboard/outboard drive, stern drive, or outboard motor. In an example in which the drive unit 18 is an outboard motor, it may be coupled to the vessel's transom 11 by way of a jack plate 19. One example of a jack plate that is remotely actuatable is described in U.S. Pat. No. 6,890,227, which was incorporated by reference herein above. The drive unit 18 has an engine (not shown here) that turns a propeller 20 to produce a thrust to propel the marine vessel 10 in a generally forward direction. At least a propulsion portion of the drive unit 18 is capable of rotating around a generally vertical steering axis in response to commands from a steering wheel or autopilot section (not shown). The drive unit 18 may also be trimmable, as will be discussed further herein below. The vessel 10 has a control system 28 including a control module 30 in signal communication with the drive unit 18 and the trim actuators 14a, 14b. The control module 30 receives speed and shift commands from a throttle lever 32; route, mapping/chart, depth, and other data from a chart plotter 34; and global position information from a global positioning system (GPS) receiver 36.

Also included on the marine vessel 10 are trim tab sensors 22a, 22b for sensing a position of the trim tabs 12a, 12b. For example, the trim tab sensors 22a, 22b may be Hall Effect sensors or potentiometers. As mentioned, the marine vessel 10 is provided with first and second trim actuators 14a, 14b. The first trim actuator 14a may comprise a hydraulic cylinder 24a connected to an electro-hydraulic actuator 26a, including a motor and pump. The hydraulic cylinder 24a operates to rotate the first trim tab 12a to a trimmed-out or zero degree position, to a trimmed-in position, or to maintain the trim tab 12a in any desired position between these two. Similarly, the second trim actuator 14b may comprise a hydraulic cylinder 24b connected to an electro-hydraulic actuator 26b and operating in the same manner. Other types of hydro-mechanical or electromechanical actuators could be used in other examples. The trim tab sensors 22a, 22b may sense a relative position of the piston rod with respect to the hydraulic cylinder 24a, 24b of each trim actuator 14a, 14b or may sense a rotational position of each trim tab 12a, 12b about its horizontal trim axis. In either case, the trim tab sensors 22a, 22b provide information related to a current position of each trim tab 12a, 12b.

Figure 2:
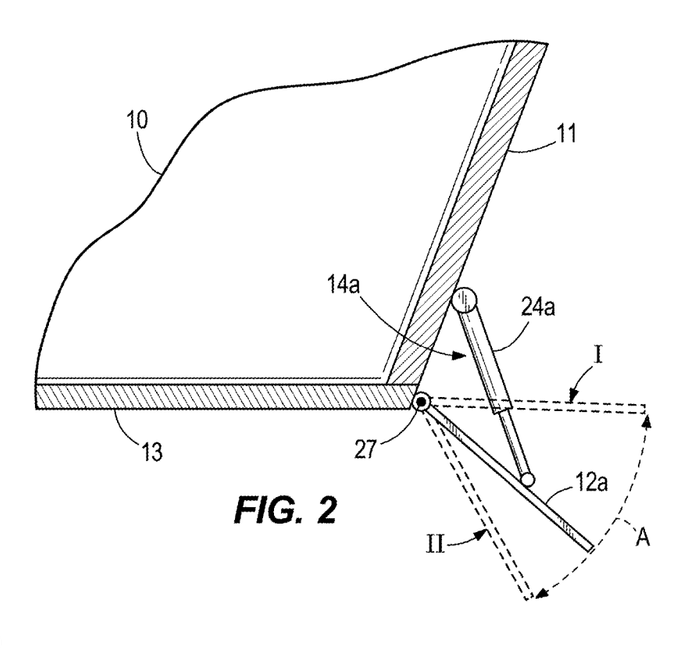
FIG. 2 illustrates details of the trim tabs and actuators of FIG. 1.

The trim tabs 12a, 12b are designed to pivot and can be actuated to different deployments with respect to the transom 11 of the marine vessel 10. With reference to FIG. 2, generally, each trim actuator 14a, 14b (only 14a is described here, but 14b is identical) has a first end coupled to the vessel 10 and a second, opposite end coupled to trim tab 12a. The trim actuator 14a is moveable to adjust a position of the trim tab 12a by rotating it with respect to the vessel 10 about trim axis 27. For example, the trim tab 12a can be deployed from 0% deployment where it projects generally horizontally (position I), to 100% deployment (position II), where it lies at a calibrated maximum angle A with respect to horizontal. Note that the trim tab 12a might instead be coupled to the vessel 10 at an angle to horizontal, such as with a v-shaped hull. In this case, the trim axis 27 for each trim tab 12a, 12b would be angled downwardly toward the vessel's keel 13. The calibrated maximum angle A at which the trim tab 12a is considered 100% deployed can vary based on the specifics of the vessel 10 to which the trim tab 12a is attached. To put the bow 42 of the vessel 10 down, both trim tabs 12a, 12b are moved down to the maximum lowered position, or "trimmed-in" position, which may be used while attempting to get on-plane. For low power or trailing operation, the trim tabs are lifted to the maximum raised position, or "trimmed-out" position. The trim tabs 12a, 12b can also be deployed to angles that are different from one another in in order to create or counteract pitch or roll movements of the marine vessel 10. These different trim angles are achieved by different positions of the hydraulic cylinders 24a, 24b.

Figure 3:
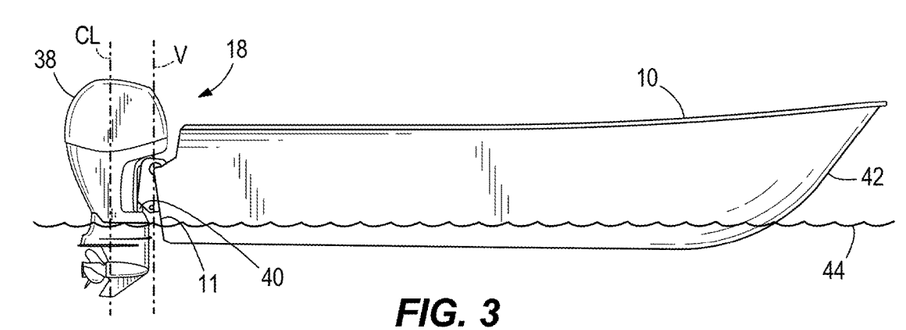
FIGS. 3-5 illustrate the marine vessel with an outboard motor coupled to its transom.
Figure 4:
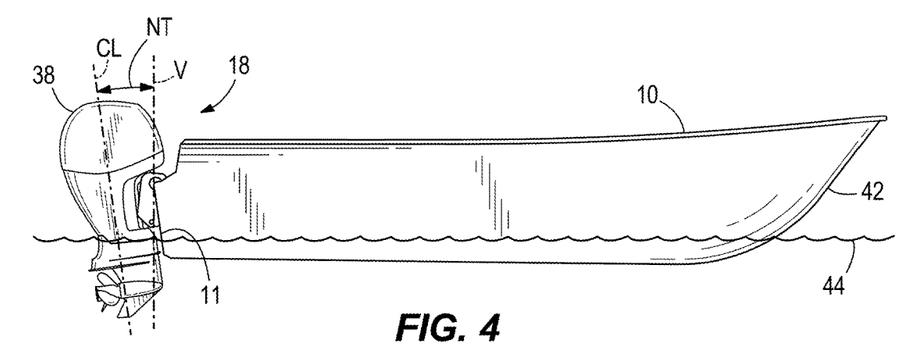
Figure 5:
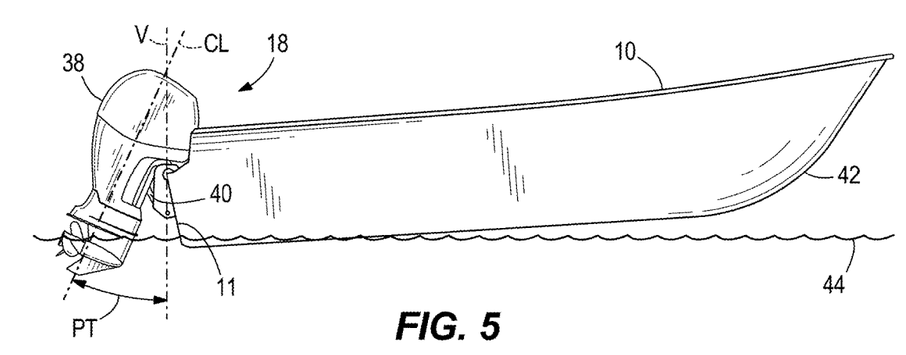

FIGS. 3-5 illustrate the marine vessel 10 in an example where the drive unit 18 is an outboard motor 38. The drive unit 18 itself comprises a trimmable marine device that can be trimmed to different angles with respect to the transom 11 via trim actuators 40 such as hydraulic cylinders having one end coupled to the transom 11 of the vessel 10 and the other end coupled to the outboard motor 38, as known to those having ordinary skill in the art. In FIG. 3, the drive unit 18 is shown in a neutral (level) trim position, in which the drive unit 18 is in more or less of a vertical position. This can be seen by comparing centerline CL of the drive unit 18 with vertical line V, where the two lines are parallel. In FIG. 4, the drive unit 18 is shown in a trimmed in (trimmed down) position. In other words, the lines CL and V will intersect below where the drive unit 18 is connected to the transom 11. This may be referred to as a negative trim angle (NT) according to an exemplary convention. In FIG. 5, the drive unit 18 is shown in a trimmed out (trimmed up) position. The lines CL and V will intersect above the drive unit's connection point to the transom 11. This may be referred to as a positive trim angle (PT). The positions in FIGS. 3 and 4 are generally used when the vessel 10 is operating at slower speeds. For example, the trim position shown in FIG. 3 is often used when the vessel 10 is in a joysticking mode or is docking. The trim position in FIG. 4 is often used during launch of the vessel 10, before the marine vessel 10 has gotten up to speed and on plane. In contrast, the trim position shown in FIG. 5 is often used when the marine vessel 10 is on plane and high speeds are required. At high speeds, the trim position shown in FIG. 5 causes the bow 42 of the marine vessel 10 to rise out of the water 44 as shown.

Figure 6:
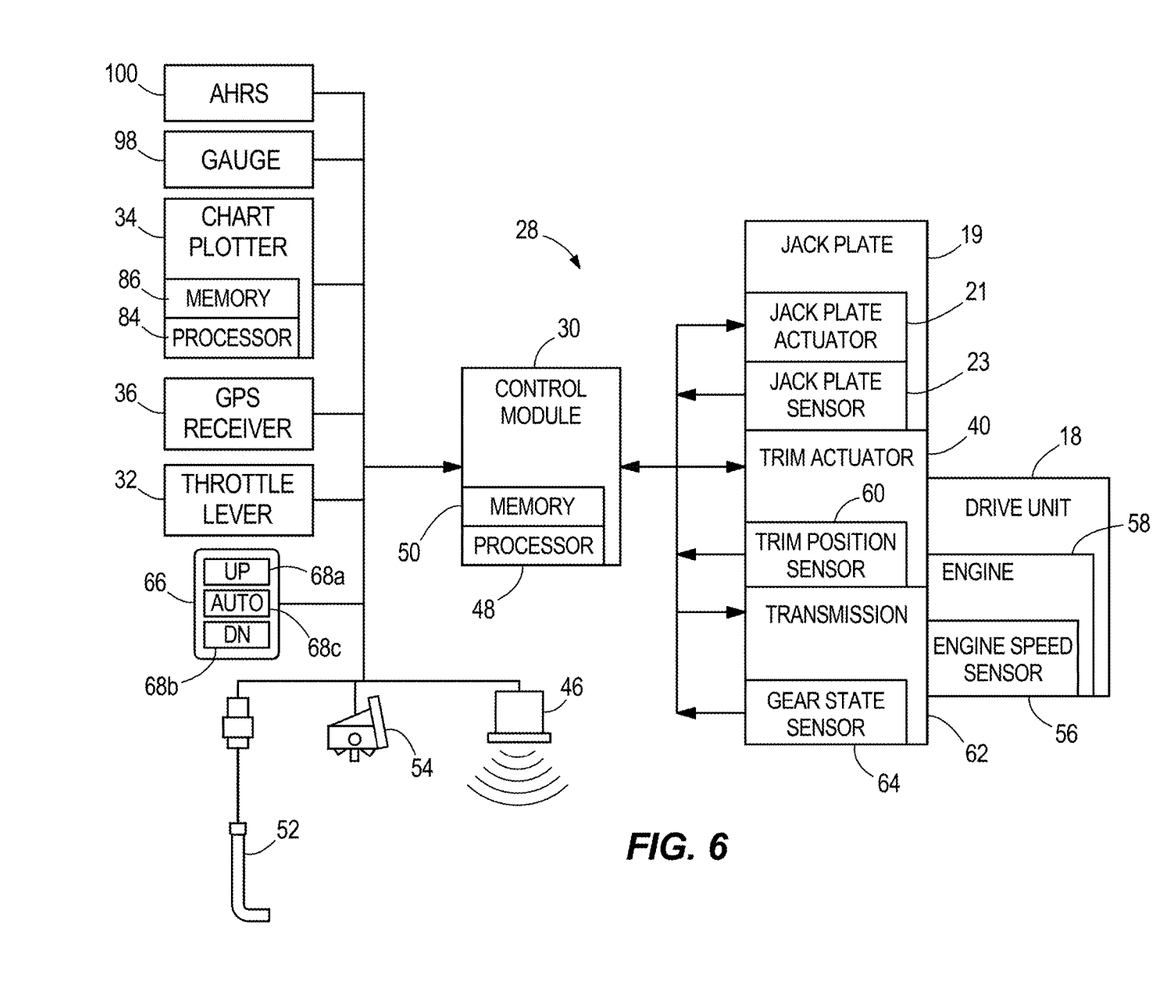
FIG. 6 illustrates one example of a system for controlling actuation of a trimmable marine device.

FIG. 6 shows an example schematic of a control system 28 for use with the devices shown and described with respect to FIGS. 1-2 or FIGS. 3-5, which control system carries out the methods described herein. Although the specific devices and connections between the devices shown in the control system 28 resemble those for a marine vessel equipped with one drive unit 18, it should be understood that the vessel 10 could have two or more drive units, and/or could additionally be equipped with trim tabs (FIGS. 1 and 2) as well as trimmable drive unit(s), and the same principles described herein would apply. For example, note that the system and method described herein with respect to FIG. 6 are equally applicable to a system and corresponding method for positioning a pair of trim tabs 12a, 12b on a transom 11 of a marine vessel 10, wherein the trim tabs replace or supplement the drive unit 18 shown in FIG. 6. Additionally, although the drive unit 18 is provided with a jack plate 19 in FIG. 6, in other examples, no jack plate 19 is provided.

In one example, the control system 28 includes the control module 30, which is programmable and includes a processor 48 and a memory 50. The control module 30 can be located anywhere in the control system 28 and/or located remote from the control system 28 and can communicate with various components of the marine vessel 10 via a peripheral interface and wired and/or wireless links, as will be explained further herein below. Although FIG. 6 shows one control module, the vessel control system 28 can include more than one control module. Portions of the method disclosed herein below can be carried out by a single control module or by several separate control modules. For example, the system can have control modules located at or near a helm of the vessel 10 and can also have control module(s) located at or near the propulsion device (e.g., drive unit 18). If more than one control module is provided, each can control operation of a specific device or sub-system on the vessel 10.

In some examples, the control module 30 may include a computing system that includes a processing system, storage system, software, and input/output (I/O) interfaces for communicating with peripheral devices. The systems may be implemented in hardware and/or software that carries out a programmed set of instructions. For example, the processing system loads and executes software from the storage system, such as software programmed with a trim control method, which directs the processing system to operate as described herein below in further detail. The computing system may include one or more processors (e.g., processor 48), which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system (e.g., memory 50) can comprise any storage media readable by the processing system and capable of storing software. The storage system can include volatile and non-volatile, removable and non-removable media implemented in any method or technology for storage of information, such as computer-readable instructions, data structures, software program modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 30 communicates with one or more components of the control system 28 via the I/O interfaces and a communication link, which can be a wired or wireless link. The control module 30 is capable of monitoring and controlling one or more operational characteristics of the control system 28 and its various subsystems by sending and receiving control signals via the communication link. In one example, the communication link is a controller area network (CAN) bus, but other types of links could be used. It should be noted that the extent of connections of the communication link shown herein is for schematic purposes only, and the communication link in fact provides communication between the control module 30 and each of the peripheral devices noted herein, although not every connection is shown in the drawing for purposes of clarity.

The control module 30 functionally converts input signals, such as but not limited to vessel control signals or information from sensors, to output signals, such as but not limited to actuator control signals, according to the computer executable instructions. Each of the input signals can be split into more than one branch, depending on how many functions are to be carried out and/or how many actuators are to be controlled with each of the input signals. The input signals may be fed to several software modules within the control module through branch signals. The exact signals input into the software modules can be taken directly from the corresponding control input device or sensor, or could be pre-processed in some way, for example by scaling through an amplifier or by converting to or from a digital signal or an analog signal using a digital-to-analog or an analog-to-digital converter. It should be appreciated that more than one input signal can be combined to provide an output signal, in which case the individual input signals may be input to the same software modules or may each be provided to an individual software module. Note that in the event that more than one signal is used to generate an output signal, a post-processing module, such as a summer, a selector, or an averaging module is used to combine the input signals into an output signal.

The provided description of the control module 30 is conceptual and should be interpreted generally, as those skilled in the art will recognize many ways to implement such a control module. These include implementation using a digital microprocessor that receives input signals or branch signals and performs a calculation using the input signals to produce the corresponding output signals or actuator control signals. Also, analog computers may be used, which comprise circuit elements arranged to produce the desired outputs. Furthermore, look-up tables containing predetermined or calibrated data points may be stored in any fashion to provide the desired output corresponding to a given input signal.

As mentioned, the control module 30 receives inputs from several different sensors and/or input devices aboard or coupled to the marine vessel 10. For example, the control module 30 receives an input from a vessel speed sensor, such a for example a pitot tube sensor 52, a paddle wheel type sensor 54, or any other speed sensor appropriate for sensing the actual speed of the marine vessel 10. The vessel speed may instead be obtained by taking readings from the GPS receiver 36 and calculating speed by determining how far the vessel 10 has traveled in a given amount of time. A water depth sensor such as a sonar 46 is also provided, one purpose of which will be described later. The drive unit 18 is provided with an engine speed sensor 56, such as but not limited to a tachometer, that determines a speed of the engine 58 powering the drive unit 18 in rotations per minute (RPM). A trim position sensor 60 is also provided for sensing an actual position of trim actuator 40, for example, by measuring a relative position between two parts (e.g., the piston rod and cylinder) associated with the trim actuator 40 or by measuring a rotational position of a movable part of the drive unit 18 (such as a swivel bracket) with respect to a stationary part (such as a transom bracket). The trim position sensor 60 may be any type of sensor known to those having ordinary skill in the art, for example a Hall Effect sensor or a potentiometer. The jack plate 19 is moved up and down by a jack plate actuator 21, such as a hydraulic or other type of piston/cylinder combination, which is also in signal communication with the control module 30. A position of the jack plate 19 is determined by a jack plate sensor 23, which provides such information to the control module 30. The jack plate sensor 23 can be a Hall Effect sensor or a potentiometer and can determine the relative position of the piston rod with respect the cylinder or the vertical position of the movable portion of the jack plate 19 with respect to the stationary portion of the jack plate 19. A transmission 62 and a gear state sensor 64 (sensing forward, neutral, or reverse gear of the transmission) can also be provided.

Other inputs to the control module 30 can come from operator input devices such as the throttle lever 32, a keypad 66, a touchscreen, a chart plotter 34, or the like. The throttle lever 32 allows the operator of the marine vessel 10 to choose to operate the vessel 10 in neutral, forward, or reverse, as is known. The keypad 66 can be used to initiate or exit any number of control or operational modes (such as auto-trim mode), or to make selections while operating within one of the selected modes. In one example, the keypad 66 comprises an interface having at least a "trim up" input 68a, a "trim down" input 68b, and an "auto-trim on/resume" input 68c, shown herein as buttons. (In some systems, these input choices are labeled "bow down" and "bow up" and command movement of the trim tabs or drive units that results in such attitude adjustment.) The control module 30 operates the control system 28 in the manual mode in response to selection of one of the "trim up" input 68a and "trim down" input 68b. For example, a trim up command will cause the trim actuator to trim the trim tab or drive unit up, while a trim down command will cause the trim actuator to trim the trim tab or drive unit down. On the other hand, the control module 30 may operate the control system 28 in the automatic mode in response to selection of the "auto-trim on/resume" input 68c. A touchscreen (not shown) can also be used to initiate or exit any number of control or operational modes (such as trim up, trim down, or auto-trim mode), and in that case the inputs can be buttons in the traditional sense or selectable screen icons. The jack plate 19 can be raised and lowered by way of operator input to the control module 30 as well, by way of a keypad similar to that shown at 66 or a touchscreen, although such keypad/touchscreen is not specifically shown herein.

The control system 28 may also include an attitude and heading reference system (AHRS) 100, which provides pitch, roll, and yaw information to the control module 30. The AHRS 100 includes solid-state or microelectromechanical systems (MEMS) gyroscopes, accelerometers and magnetometers for determining such attitude information. The AHRS 100 also determines a heading of the vessel 10 with respect to north. In another example, an inertial measurement unit (IMU) is provided instead of an AHRS, and the control module 30 uses information from the IMU to calculate the vessel's heading. In another example, separate compasses, magnetometers, inclinometers, etc. are included for providing each of these attitude measurements to the control module 30.

Figure 7:
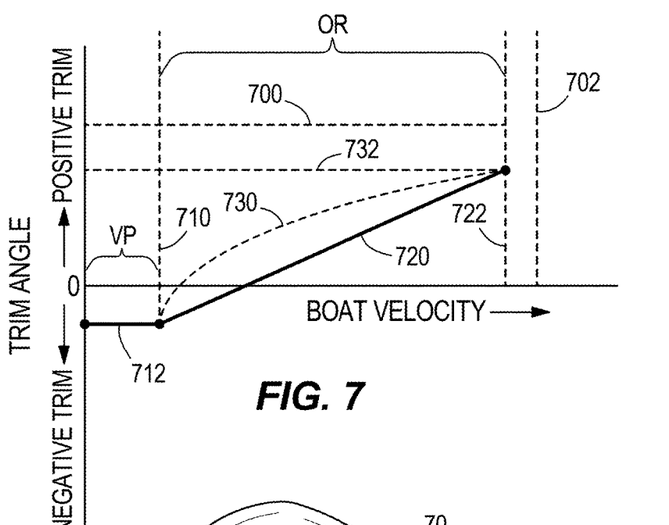
FIG. 7 is a graph illustrating one example of a relationship between an automatically set trim angle and vessel speed.

As mentioned, the control module 30 selectively controls the control system 28 in an automatic trim mode, in which the control module 30 sends signals to activate the trim actuator 40 automatically. The trim actuator 40 can be automatically activated as a function of a speed of the vessel 10 or as a function of a speed of the engine 58 powering the drive unit 18, according to the auto-trim algorithm provided in the software. For example, FIG. 7 is a graphical representation showing an exemplary relationship between the trim angle of a drive unit 18 and the velocity of a vessel 10 according to one example of an auto-trim method. An algorithm that accepts engine speed as an input might be exemplified by a similar relationship, although such a relationship is not shown herein in graphical form. In FIG. 7, line 700 represents a maximum positive trim angle PT of the drive unit 18 that will maintain the drive unit 18 in the water at a functional position. Dashed line 702 represents the maximum velocity of the marine vessel 10. Dashed line 710 represents the planing speed of the marine vessel 10. Line 712 represents the change in velocity of the marine vessel 10 from a stationary condition to the achievement of planing speed at dashed line 710. This increase in velocity is identified as VP in FIG. 7. In one example, the trim angle of the drive unit 18 is maintained at a negative magnitude of NT such as shown in FIG. 4. This negative trim angle is maintained until the vessel 10 reaches planing speed 710. Then, the trim angle is increased as a function of vessel speed as indicated by line 720 in FIG. 7. This continues until the vessel 10 achieves a velocity which is represented by dashed line 722. It can be seen that this velocity represented by dashed line 722 is less than the maximum velocity 702 of the marine vessel; however, in other examples, it could instead be at the maximum velocity 702. The range of speeds between dashed lines 710 and 722 is identified as its operating range OR, during which the trim angle is changed, according to this example, as a function of the vessel speed. In FIG. 7, this rate of change is linear as represented by line 720. However, as represented by dashed line 730, this relationship need not be linear in all applications. Dashed line 732 represents the maximum trim that is achieved during automatic trim operation when the marine vessel 10 achieves the second speed magnitude 722. In one example, this maximum trim is trim angle PT shown in FIG. 5. In other examples, the maximum trim achieved during automatic trimming is that represented by dashed line 700. It should be understood that the relationships shown in FIG. 7 are merely exemplary, and that auto-trim systems can be programmed to operate according to various different relationships between vessel speed (or engine speed) and trim angle.

It should be noted that the graph shown in FIG. 7 is meant to show position of a drive unit 18 such as an outboard motor 38 or a stern drive according to the positive and negative trim angle conventions described herein with respect to FIGS. 3-5. If different conventions were used, the graph would not be the same. It should also be understood that if the devices whose positions were being graphed were trim tabs (FIGS. 1 and 2), the trim tabs 12a, 12b would be gradually lowered from the level position I to the fully deployed position II during launch (i.e., angle A would be increasing), and then raised back up toward the level position I once the vessel was on plane (i.e., angle A would be decreasing). For further description, see U.S. Pat. No. 5,263,432, incorporated by reference herein above. In either instance, however, the general principle is that a drive unit and/or trim tab can be deployed to different positions depending on boat speed or engine speed in order to affect fuel efficiency, handling, ride quality, and launch time of a vessel.

Figure 8:
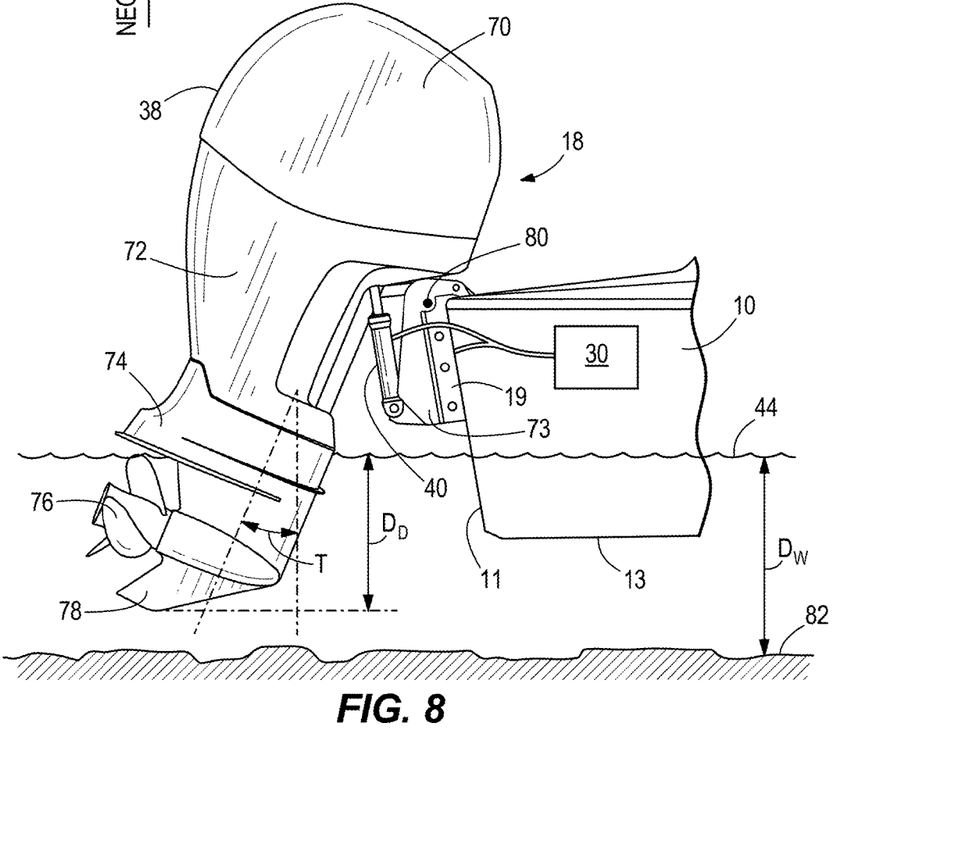
FIG. 8 illustrates a more detailed view of an outboard motor and accompanying trim actuator.

FIG. 8 shows an example in which the trimmable marine device is again the outboard motor 38. The outboard motor 38 has a powerhead section 70 supported on a midsection 72, which is coupled to the vessel's transom 11 via a transom bracket 73 and jack plate 19. The midsection 72 supports a lower unit 74 (sometimes called a gear case). The lower unit 74 holds a propeller shaft that supports a propeller 76 for rotation about a propeller shaft axis. The lower unit 74 also includes a skeg 78, which is the lowest point on the outboard motor 38 (or on a stern or pod drive). The skeg 78 protects the propeller 76 from damage: if the skeg 78 hits an obstruction (e.g., a log, rock, etc.), the outboard motor 38 may be designed to rotate upwardly about a horizontal tilt/trim axis 80 to avoid further damage to the drive unit 18. For further explanation of such a "trail over" feature, see U.S. Pat. No. 9,290,252, incorporated by reference herein above. Although such a trail over feature is helpful to prevent damage to the drive unit 18 in certain circumstances, the present inventors have realized that with the advent and increasing popularity of auto-trim and auto-tab systems, many operators might not be aware of the depth of trimmable marine devices on their vessels because they themselves did not manually command their trim positions. Therefore, the present inventors realized that relying solely on the trail over feature to protect the trimmable marine device from damage due to contact with a bottom 82 of the body of water 44 is not ideal. For instance, the force generated by the skeg 78 hitting the bottom 82 might not be great enough to rotate the drive unit 18 about the axis 80. Even if this force is great enough to cause the drive unit 18 to rotate upwardly, there is no feature that prevents the drive unit 18 from rotating back down about the axis 80 to the speed-related target trim position described herein above with respect to FIG. 7.

Therefore, the present inventors have developed a system and method that ensure the drive unit 18 is trimmed up by way of the trim actuator 40 or raised up by way of the jack plate 19 out of harm's way when the vessel 10 is in shallow water. The present system and method are functional even on vessels that are not equipped with sonar depth finders (see 46, FIG. 6). The present control system 28 for a marine vessel 10 operating in a body of water 44 includes a trimmable marine device (drive unit 18 and/or trim tabs 12a, 12b) coupled to and movable with respect to the marine vessel 10. An actuator, such as trim actuator 40 and/or 14a, 14b or jack plate actuator 21, is configured to raise and lower the marine device 18 and/or 12a, 12b with respect to a surface of the body of water 44. For example, the trim actuator 40 and/or 14a, 14b rotates the marine device(s) 18 and/or 12a, 12b about a trim axis 80 and/or 27. In another example, the jack plate actuator 21 raises and lowers the movable portion of the jack plate 19 and thus the drive unit 18 connected thereto along a relatively vertical axis. A control module 30 is in signal communication with the trim actuator 40 and/or 14a, 14b and the jack plate actuator 21. Henceforward, the present system will be described with respect to the example in which the trimmable marine device is the outboard motor 38, but it should be understood that the description applies also to other trimmable drive units and to trim tabs.

Referring to both FIGS. 6, and 8, such a control system 28 also includes a global positioning system (GPS) receiver 36 that determines a global position of the vessel 10. The GPS receiver 36 can be a differential GPS receiver, could be part of an inertial measurement unit (IMU) or part of the attitude heading and reference system (AHRS) 100, or could be part of the chart plotter 34. The control module 30 uses information from the GPS receiver 36 to determine at least one of a current and a predicted global position of the vessel 10. For example, the control module 30 determines the predicted global position of the vessel 10 based on the vessel's measured current global position as indicated by the GPS receiver 36 and at least one of a predetermined course for the vessel 10 as indicated by the chart plotter 34, a heading of the vessel 10 as indicated by the AHRS 100 or a compass, a yaw rate of the vessel 10 as indicated by the AHRS 100 or an IMU, and a speed of the vessel as indicated by the GPS receiver 36 or the pitot tube 52 or paddle wheel 54. The control system 28 also includes a processor that accesses a memory storing bathymetry data and retrieves a water depth $D_W$ corresponding to the vessel's current or predicted global position. In one example, the processor 48 and memory 50 are part of the control module 30. The memory 50 stores a collection of data relating geographical position to water depth, such as data provided by the United States Geological Survey (USGS). The data could be stored in an input/output database or in a bathymetric or hydrographic/nautical map or chart, such as in an electronic navigational chart (ENC) provided by the National Oceanic and Atmospheric Administration (NOAA). The data could be located permanently in a local memory, in a remote memory accessed via satellite (e.g., the cloud), or downloaded from the internet or from a disk or drive and stored temporarily in the local memory. In general, any GPS-based geographic information system can be accessed for purposes of determining current depth data.

In another example, instead of the control module 30 directly accessing the GPS-based depth data using its own processor 48 and local memory 50 or remote memory, the chart plotter 34 may contain the processor 84 and the memory 86 for retrieving and storing such GPS-based depth data. One example of a chart plotter 34 is shown in more detail in FIG. 9. The chart plotter 34 includes a display screen 88, which may be a touch display screen. The chart plotter 34 may also include buttons 90 that allow an operator to access different functions of the chart plotter, such as power on/off, zoom in/out, menu selection buttons, etc. In on example, the chart plotter 34 may be a combined chart plotter and fish finder, which may interact with the sonar 46 (FIG. 6). The chart plotter 34 may be programmed to display a digital or raster map 92 of the body of water 44 that includes a number of depth contours, shown here on the display screen 88. The map 92 can be downloaded from a disk or drive or from the internet and may be developed by a third party who creates custom contour maps of oceans, lakes, and rivers, using not only data available from the USGS and NOAA, but also from many boaters who record depths at various locations on various bodies of water. These third parties have developed chart library application programming interfaces (APIs) that allow chart plotter manufacturers to embed the APIs into their operating systems and thus make these maps, proprietary to the third party developers, accessible from the chart plotter 34. The processor 84 can be programmed to process the ENC data in one of several different ways. In one instance, the depth information is formatted as a two-dimensional array of cells centered at a specific latitude and longitude. In this array of cells, there is a predetermined distance between each cell, for example in meters or feet. Each cell contains depth information that corresponds to the location at the center of that cell. The depth information is available for an entire region without having to request more data from the depth data provider. In a second instance, in which the processor 84 does not have a large amount of memory to act as a depth information buffer, the processor 84 can repeatedly request depth information at individual geographical locations. In any case, the display screen 88 can show the global position 94 of the vessel 10 on the map 92, as well as note the vessel's speed, heading, current depth, and geographical position in terms of latitude and longitude. Note that a more generic electronic chart display and information system (ECDIS) could be used in place of a chart plotter 34.

Figure 9:
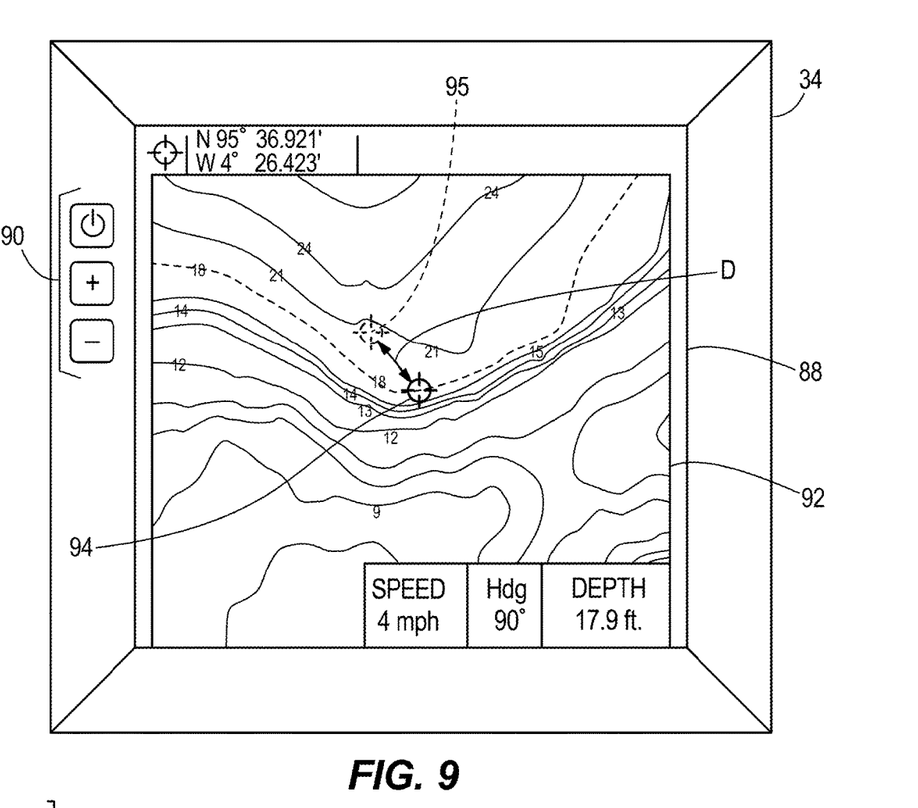
FIG. 9 illustrates one example of a chart plotter.

Referring still to FIG. 9, in the example in which the control module 30 determines a predicted global position 95 of the vessel 10 and obtains or is provided with a water depth corresponding to the vessel's predicted global position 95, the control module 30 selects a distance D from the vessel 10 at which to determine the predicted global position 95 based on the vessel speed. Depending on the speed of the vessel 10, the control module 30 may choose how far to look ahead of the vessel 10 so as to raise the marine device 18 before the vessel 10 reaches shallower water. This may be desirable because the actuation movement of the trim actuator 40 and jack plate actuator 21 is not immediate. In one example, the faster the vessel 10 is traveling, the further the control module 30 looks ahead for purposes of determining the predicted global position 95. The control module 30 may be programmed always to use the current global position 94 for determining water depth; always to use the predicted global position 95 for determining water depth; or to use the current global position 94 to determine water depth until the vessel speed exceeds a predetermined speed, after which it uses the predicted global position 95 to determine water depth. The control module 30 can use a given distance D from the vessel 10 at which to predict the global position and determine the water depth, or can use a look-ahead distance D that varies with vessel speed.

Returning to FIGS. 6 and 8, before, after, or while the control module 30 or chart plotter 34 retrieves the water depth $D_W$ at the vessel's current or predicted geographic location, the control module 30 also determines a current position of the marine device 18 using information from a sensor associated with the trim and/or jack plate actuator. For example, the control module 30 receives a trim position T of the marine device 18 using information from the trim position sensor 60 associated with the trim actuator 40. The control module 30 may also receive a jack position of the marine device 18 using information from the jack plate sensor 23 associated with the jack plate actuator 21. The control module 30 can then use this information to determine a depth $D_D$ of the marine device 18 below the surface of the water 44. For instance, the processor 48 might access an input-output map such as a graph or lookup table stored in the memory 50 to determine the depth of the marine device 18 given the measured trim position from the trim position sensor 60 and/or jack position from the jack plate sensor 23. In other examples, the processor 48 might use an equation to calculate the depth of the marine device 18 based on the measured trim or jack position, calibrated and stored values of hull depth and/or distance from the bottom of the skeg 78 to the keel 13 when the marine device 18 is trimmed to the neutral position (FIG. 3) and the jack plate 19 (if provided) is in a fully raised or fully lowered position, and/or data from a sensor such as a sonar located on the lower unit 74 or skeg 78. For instance, knowing that the skeg 78 is X inches below the keel 13 when the marine device 18 is in the neutral position, the depth of the skeg 78 can be calculated at other trim positions using geometry.

Once the control module 30 determines the depth of the marine device 18 based on the current trim position T and/or jack position of the marine device 18, the control module 30 compares the water depth $D_W$ to the depth $D_D$ of the marine device 18. The trim actuator 40 will raise the marine device 18 in response to a determination by the control module 30 that the water depth $D_W$ is not enough to accommodate the depth $D_D$ of the marine device 18 at the current position (such as at current trim position T) without potential collision between the marine device 18 and the bottom 82 of the body of water 44. The control module 30 can raise the marine device 18 by trimming the marine device 18 up in the event that a jack plate is not provided on the vessel, or is provided but is actuatable only by hand as opposed to in response to a control signal. If a jack plate 19 is provided and is coupled to the control module 30, the control module 30 can select between raising the marine device 18 by raising the movable part of the jack plate 19 or by trimming the marine device 18 about its horizontal trim axis 80. The control module 30 may make this selection based on the relative depths of the marine device 18 and the water. In another example, the control module 30 may be programmed to first jack the marine device 18 up to prevent collision with the bottom 82, and if that movement is not sufficient, to thereafter trim the marine device 18 up even further.

Note that the vessel's current global position 94 can be used to determine the depth of the water in the instance where the GPS receiver 36 is located fore of the trimmable marine device 18. Retrieving the water depth $D_W$ fore of the marine device 18 will provide the control module 30 time to adjust the trim position of the marine device 18 if necessary before the marine device 18, which is further back on the vessel 10, reaches that same geographic position. In other examples, the control module 30 can be programmed to calculate the water depth $D_W$ out in front of the vessel 10 based on a trend in already-determined water depths or based on the predicted global position 95 of the vessel 10, as described herein above, to provide more time to adjust the trim position and/or jack position before potential collision between the marine device 18 and the bottom 82. In another example, the control module 30 can be programmed to add in a safety factor (or offset) to its determinations, such that it assumes the water is shallower than the GPS-based depth information otherwise indicates. For example, the control module 30 might determine if the depth $D_D$ of the marine device 18 is within a threshold value of the water depth $D_W$. The safety offset also accounts for the fact that the bottom terrain might have changed since the bathymetry data were last updated or that fact that small rises or dips in bottom elevation might not have been recorded as part of the bathymetry data. In either instance, if the control module 30 determines that $D_D \geq D_W$ (or that $D_W - D_D \leq$ threshold), the control module 30 will command the trim actuator 40 to trim the marine device 18 up and/or will command the jack plate actuator 21 to jack the marine device 18 up.

According to the auto-trim algorithm described herein above, the control module 30 may trim the marine device 18 to a neutral trim position (FIG. 3) or to a trimmed under/in position when at low speeds (see FIG. 4). Generally, a vessel operator will run at low speeds when the operator is nearing shore, due to the desire to avoid hitting the bottom 82, the presence of other vessels nearby, and/or a low or no wake zone restriction. Therefore, the control module 30 may be programmed such that the trim actuator 40 raises the marine device 18 in response to both (a) the determination that the water depth $D_W$ is not enough to accommodate the depth $D_D$ of the marine device 18 at the current position (e.g., trim position T), and (b) an additional determination by the control module 30 that the vessel 10 is not on plane. In one example, the control module 30 determines a speed of the vessel 10 based on information from the GPS receiver 36 and determines that the vessel 10 is not on plane in response to the vessel speed being lower than a given threshold speed. For example, if the particular vessel is known to switch from off- to on-plane (or vice versa) around X mph, the control module 30 might determine that the vessel 10 is off plane when the vessel speed is ±5 mph of X. Note that X will be different for each vessel and may even vary for a given vessel based on factors such as the load the vessel 10 is carrying. In other examples, in addition or alternative to using vessel speed to determine if the vessel 10 is not on plane, the control module 30 may also use a pitch of the vessel 10 read from the AHRS 100, an IMU, or other type of inclinometer or a tracked change in engine load (e.g., engine load rises to a maximum and then drops) to determine when the vessel 10 switches from on plane to off plane.

Figure 10:
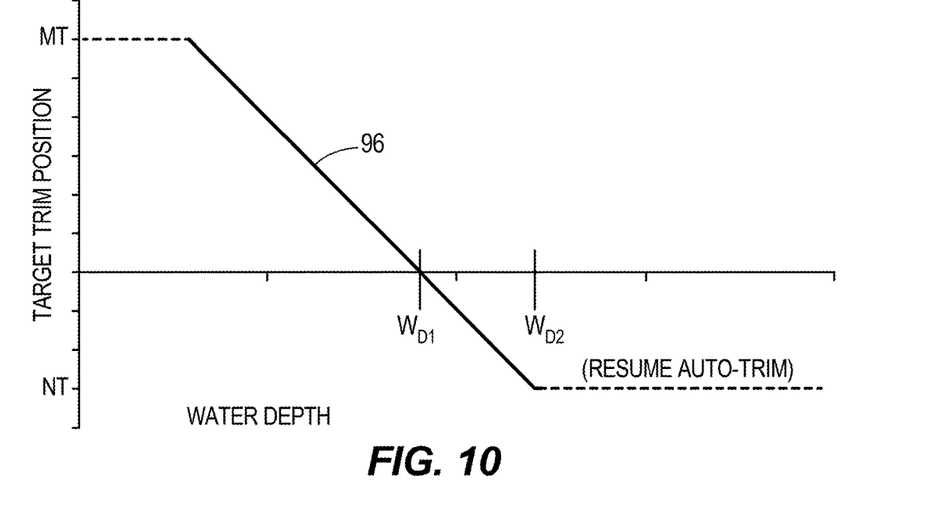
FIG. 10 is a graph illustrating one example of a relationship between water depth and target trim position.

It is not necessary for the jack plate actuator 19 to raise the marine device 18 to a height that will lift the propeller 76 out of the water 44 or even level with the keel 13, nor is it necessary for the trim actuator 40 to trim the marine device 18 all the way up to a positive trim angle PT that will lift the propeller 76 out of the water 44 or level with the keel 13. Rather, the control module 30 may determine a target position for the marine device 18 based on the water depth $D_W$, and the trim actuator 40 or jack plate actuator 21 may raise the marine device 18 to the target position. The control module 30 determines the target position according to a predefined relationship between water depth and target position, such as from a chart, a look-up table, or another type of input-output map. According to this predefined relationship, the target position is inversely related to the water depth, such as for example as shown by the negative slope of the relationship 96 shown in FIG. 10. FIG. 10 shows an exemplary relationship between water depth on the x-axis and target trim position on the y-axis, in an example in which the control module 30 varies trim position to avoid collision between the marine device 18 and the bottom 82 of the body of water 44. Note that the exact slope of the relationship 96 shown here is for explanatory purposes only and does not represent the actual slope of the relationship that may be calibrated into the software of the control module 30. Rather, of note is that as water depth decreases, the target trim position increases (recall that trim position is measured clockwise from vertical, as described with respect to FIGS. 3-5), at least in the middle ranges of water depth, because the marine device 18 needs to be higher in the water the shallower the water gets. The control module 30 may command the trim actuator 40 to raise the marine device 18 to successively higher target trim positions as the water depth decreases, for example, as the vessel moves closer toward shore. At some point, the marine device 18 may reach a maximum trim position MT, such as if the piston rod has extended all the way from the cylinder for the actuator 40 or has retracted all the way into the cylinder for trim tab actuators 14a, 14b. Once the trim position sensor 60 reports this trim position MT to the control module 30, the control module 30 may command the trim actuator 40 to cease attempting to trim up. Note that even before the trim actuator 40 moves the marine device 18 to the maximum trim position MT, in the higher trim position range, the slope of the relationship between water depth and trim angle may decrease or even level off to a slope of near zero or zero.

The control module 30 may also command the trim actuator 40 to take the reverse action. For example, the control module 30 commands the trim actuator 40 to lower the marine device 18 in response to a determination that the water depth has increased. Before commanding the trim actuator 40 to trim down, the control module 30 may also require that, for at least a predetermined period of time, the water depth has not thereafter decreased. This will prevent the marine device 18 from being trimmed up and down repeatedly over each small change in elevation according to the data from the ENC. The control module 30 will command the marine device 18 to trim down to successively lower target trim positions as the water depth increases, such as while the vessel 10 moves away from shore. Note that a similar relationship between water depth and jack position of the marine device 18 may be stored in the memory 50 of the control module 30, although such relationship is not explicitly shown herein. The control module 30 may command the jack plate actuator 21 to raise and lower the jack plate 19 as the water depth decreases and increases, respectively.

Still referring to FIG. 10, at some water depth $W_{D1}$, there will be no chance the marine device 18 will touch the bottom 82, and the marine device 18 can begin trimming to the negative trim angle NT (see FIG. 4) if the speed-based auto-trim program dictates this. Thus, note that when the control module 30 is configured to operate the trim actuator 40 in the auto-trim mode, in which (as noted above) the trim actuator 40 trims the marine device 18 automatically as a function of a speed of the vessel 10 or a speed of an engine 58 powering the vessel 10, the control module 30 commands the trim actuator 40 to trim the marine device 18 down to a speed-based trim position in response to the determination that the water depth has increased. This may need to be done in increments, if so dictated by water depth. Here, the water becomes deep enough to accommodate the marine device 18 at a depth of $W_{D2}$. Thereafter, the trim position will remain at the speed-based negative trim position NT until the water depth decreases or the speed of the vessel 10 changes. This allows the marine device 18 to be trimmed back to the position the vessel operator would expect based on the auto-trim algorithm once the water is deep enough to do so.

Figure 11:
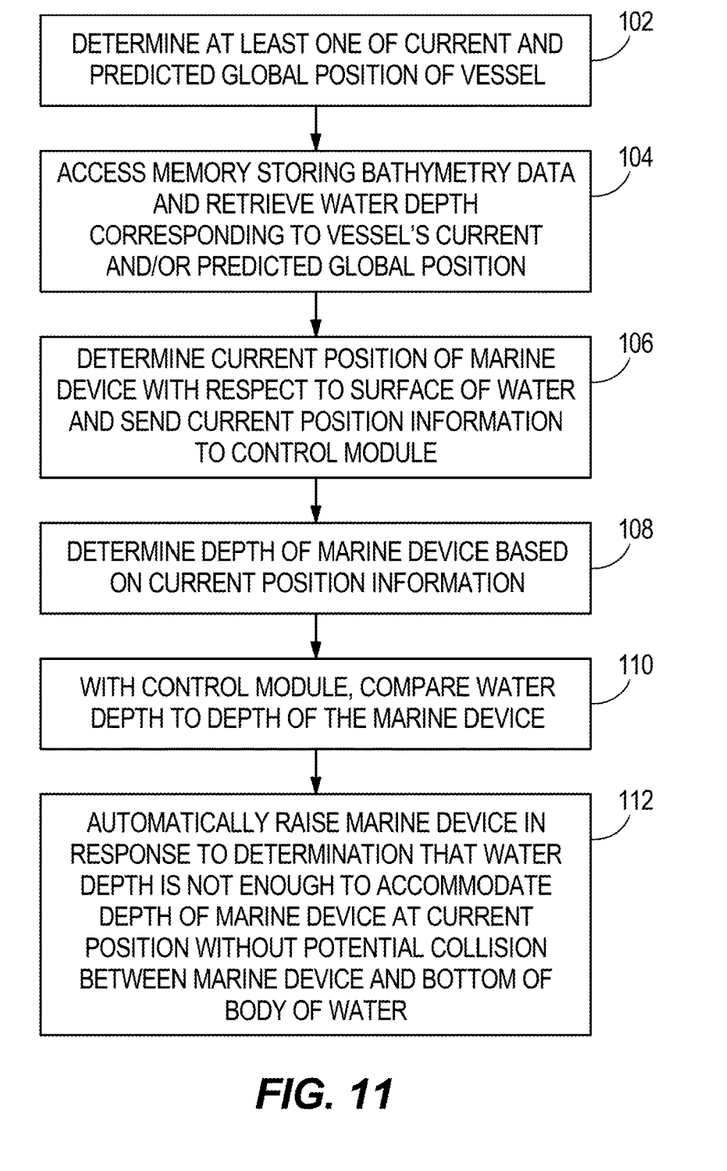
FIG. 11 illustrates a method for moving a trimmable marine device according to the present disclosure.

A method according to the present disclosure for moving a trimmable marine device 18 coupled to a marine vessel 10 operating in a body of water 44 is shown and described with respect to FIG. 11. As shown at 102, the method includes determining at least one of a current and a predicted global position 94, 95 of the vessel 10, such as by using GPS receiver 36 and/or AHRS 100, chart plotter 34, and control module 30. As shown at 104, the method includes accessing a memory storing bathymetry data with a processor and retrieving a water depth $D_W$ corresponding to the at least one of the current and predicted global position 94, 95. As noted herein above, this method step could be performed by the processor 48 accessing the memory 50 of the control module 30 or the processor 84 accessing the memory 86 of the chart plotter 34. In the latter case, it is the chart plotter 34 that contains the memory 86 storing the bathymetry data, and the chart plotter 34 receives the vessel's current and/or predicted global position from the GPS receiver 36 and provides the water depth to the control module 30. In yet another example, the processor 48 of the control module 30 might access a remote memory on the internet or might access the memory 86 of the chart plotter 34. As shown at 106, the method also includes determining a current position of the marine device 18 with respect to a surface of the body of water 44, such as by using information from trim position sensor 60 and/or jack plate sensor 23, and sending current position information to the control module 30. Note that this step could be done before, after, or during steps 102 and/or 104.

As shown at 108, the method also includes determining a depth $D_M$ of the marine device 18 based on the current position information, which can be done in multiple ways as described herein above. As shown at 110, the method then includes comparing the water depth $D_W$ at the at least one of the current and predicted global position to the depth $D_M$ of the marine device 18. This comparison may or may not include a safety offset, as described with respect to FIG. 8. After this comparison, the method includes automatically raising the marine device 18 with an actuator 21, 40 in response to a determination by the control module 30 that the water depth $D_W$ is not enough to accommodate the depth $D_M$ of the marine device 18 at the current position without potential collision between the marine device 18 and the bottom 82 of the body of water 44, as shown at 112.

Before performing step 112, the method may further include determining a speed of the vessel 10, such as according to information from the speed sensors 52, 54 or the GPS receiver 36, and performing step 112 only if the vessel speed is less than a given threshold speed. This indicates that the vessel 10 is likely not on plane and may be travelling in shallow water and/or with the marine device 18 trimmed to neutral or trimmed under. Step 112 may further comprise raising the marine device 18 to a target position, which is determined based on the water depth $D_W$. As noted above, after performing step 112, the method may further include commanding the trim actuator 40 and/or jack plate actuator 21 to lower the marine device 18 in response to a determination that the water depth $D_W$ has increased and, for at least a predetermined period of time, has not thereafter decreased.

Other features of the present system and method will now be described. Returning to FIG. 6, the present method might be carried out only when the auto-trim functionality is turned on, such as by way of input 68c. In another example, the present method may be initiated by selecting an option separate from the auto-trim option, via a separate input screen, keypad, button, or the like. The functionality may remain on until it is turned off by pressing of the same input option, or until a key-off/key-on cycle of the engine 58. In yet another example, the present algorithm is always on by default while the engine 58 is on, and the operator must press a button or switch to turn it off.

In one example, the control system 28 includes a gauge 98 that provides an alert to an operator of the vessel 10 in response to the determination that the water depth $D_W$ is not enough to accommodate the depth $D_D$ of the marine device 18 at the current trim position T or jack position. This may be done in the event that the auto-trim system is turned off, is on but is not functioning properly, or even if the auto-trim system is on and functioning, in addition to the automatic trimming up of the marine device 18. The gauge 98 may be a device at the operator's console/helm that flashes a light or a message about shallow water and/or emits a beep, vocal warning, or other alert to the operator.

The present algorithm may also be able to take in account additional data relating to water depth. For example, for smaller bodies of water such as rivers or small lakes, the control module 30 may retrieve recent rainfall and/or snow melt data from the internet, and adjust either the water depth or safety offset accordingly. For larger bodies of water, the control module may obtain tidal information from the internet, such as from the NOAA, and adjust the water depth or safety offset accordingly. These types of options may selectable by the operator via a touchscreen or the like at the operator's console/helm, especially if the operator notices a significant variability in water depth based on the above-mentioned factors on a particular body of water that the operator boats in often.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It should be noted that the method steps may be performed in any order, unless logic or the present description dictates otherwise. It is to be expected that various equivalents, alternatives and modifications are possible within the scope of the appended claims.

What is claimed is:

1. A system for a marine vessel operating in a body of water, the system comprising:
    a trimmable marine device coupled to and movable with respect to the marine vessel;
    an actuator configured to raise and lower the marine device relative to a surface of the body of water;
    a control module in signal communication with the actuator;
    a global positioning system (GPS) receiver that determines at least one of a current and a predicted global position of the vessel;
    a processor that accesses a memory storing bathymetry data and retrieves a water depth corresponding to the at least one of the current and the predicted global position; and
    a sensor associated with the actuator that provides information related to a current position of the marine device to the control module;
    wherein the control module compares the water depth to a depth of the marine device based on the current position of the marine device; and
    wherein the actuator raises the marine device in response to a determination by the control module that the water depth is not enough to accommodate the depth of the marine device at the current position without potential collision between the marine device and a bottom of the body of water.

2. The system of claim 1, wherein the actuator raises the marine device in response to both (a) the determination that the water depth is not enough to accommodate the depth of the marine device at the current position, and (b) an additional determination by the control module that the vessel is not on plane.

3. The system of claim 2, wherein the control module determines a speed of the vessel based on information from the GPS receiver and determines that the vessel is not on plane in response to the vessel speed being lower than a given threshold speed.

4. The system of claim 1, wherein the control module determines a target position for the marine device based on the water depth, and the actuator raises the marine device to the target position.

5. The system of claim 4, wherein the control module determines the target position according to a predefined relationship between water depth and target position, according to which predefined relationship the target position is inversely related to the water depth.

6. The system of claim 5, wherein the control module commands the actuator to lower the marine device in response to a determination that the water depth has increased and, for at least a predetermined period of time, has not thereafter decreased.

7. The system of claim 6, wherein the actuator is a trim actuator that rotates the marine device with respect to the vessel about a horizontal trim axis;
    wherein the control module is configured to operate the trim actuator in an auto-trim mode, in which the trim actuator trims the marine device automatically as a function of a speed of the vessel or a speed of an engine powering the vessel; and
    wherein the control module commands the trim actuator to lower the marine device to a speed-based trim position in response to the determination that the water depth has increased.

8. The system of claim 1, further comprising a gauge that provides an alert to an operator of the vessel in response to the determination that the water depth is not enough to accommodate the depth of the marine device at the current position.

9. The system of claim 1, further comprising a chart plotter that contains the memory storing the bathymetry data, wherein the chart plotter receives the at least one of the current and the predicted global position from the GPS receiver and provides the water depth to the control module.

10. The system of claim 1, wherein the control module determines the predicted global position of the vessel based on the current global position and at least one of a predetermined course for the vessel, a heading of the vessel, a yaw rate of the vessel, and a speed of the vessel.

11. The system of claim 10, wherein the control module selects a distance from the vessel at which to determine the predicted global position based on the vessel speed.

12. A method for moving a trimmable marine device coupled to a marine vessel operating in a body of water, the method comprising:
    (a) determining at least one of a current and a predicted global position of the vessel;
    (b) with a processor, accessing a memory storing bathymetry data and retrieving a water depth corresponding to the at least one of the current and the predicted global position;
    (c) determining a current position of the marine device with respect to a surface of the body of water and sending current position information to a control module;
    (d) determining a depth of the marine device based on the current position information;
    (e) with the control module, comparing the water depth to the depth of the marine device; and
    (f) automatically raising the marine device with an actuator in response to a determination by the control module that the water depth is not enough to accommodate the depth of the marine device at the current position without potential collision between the marine device and a bottom of the body of water.

13. The method of claim 12, wherein before performing step (f), the method further comprises:
    (g) determining a speed of the vessel; and
    performing step (f) only if the vessel speed is less than a given threshold speed.

14. The method of claim 13, wherein step (f) further comprises raising the marine device to a target position; and the method further comprises:

(h) determining the target position based on the water depth.

15. The method of claim 14, wherein after performing step (f), the method further comprises:

(i) with the control module, commanding the actuator to lower the marine device in response to a determination that the water depth has increased and, for at least a predetermined period of time, has not thereafter decreased.

16. The method of claim 15, further comprising:

(j) with the control module, commanding the actuator to raise the marine device to successively higher target positions as the water depth decreases; and (k) with the control module, commanding the actuator to lower the marine device to successively lower target positions as the water depth increases.

17. The method of claim 16, wherein the actuator is a trim actuator that rotates the marine device with respect to the vessel about a horizontal trim axis, and further comprising:

(l) trimming the marine device according to an auto-trim mode, in which the control module sends signals to trim the marine device automatically as a function of the vessel speed or a speed of an engine powering the vessel; and (m) performing step (k) until the marine device is lowered to a speed-based trim position.

18. The method of claim 12, wherein step (b) is performed by a chart plotter.

19. The method of claim 12, further comprising:

(g) providing an alert to an operator of the vessel in response to the determination that the water depth is not enough to accommodate the depth of the marine device at the current position.

20. The method of claim 12, wherein step (f) comprises determining if the depth of the marine device is within a threshold value of the water depth.

\* \* \* \* \*